United States Patent Office 3,222,869
Patented Dec. 14, 1965

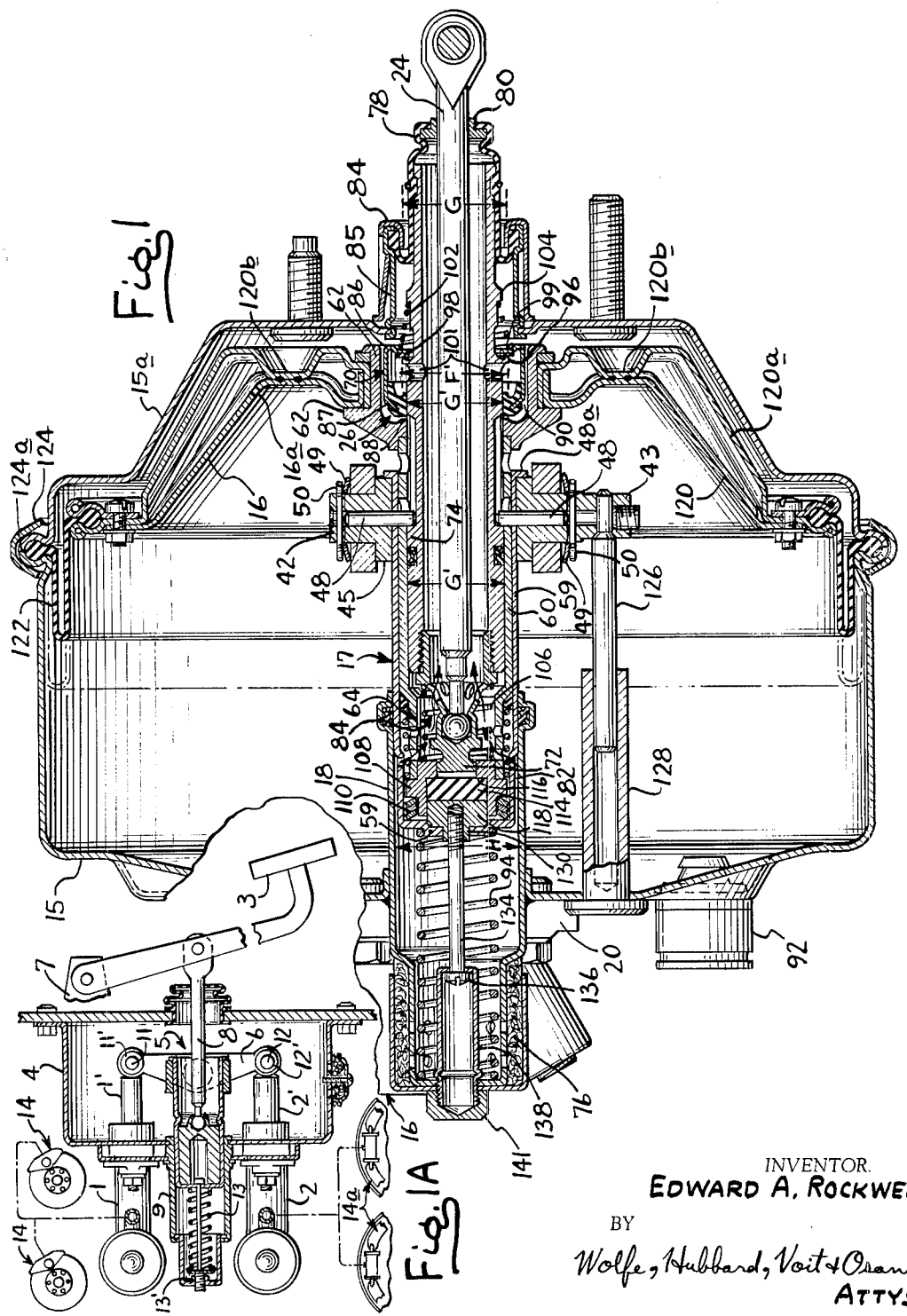

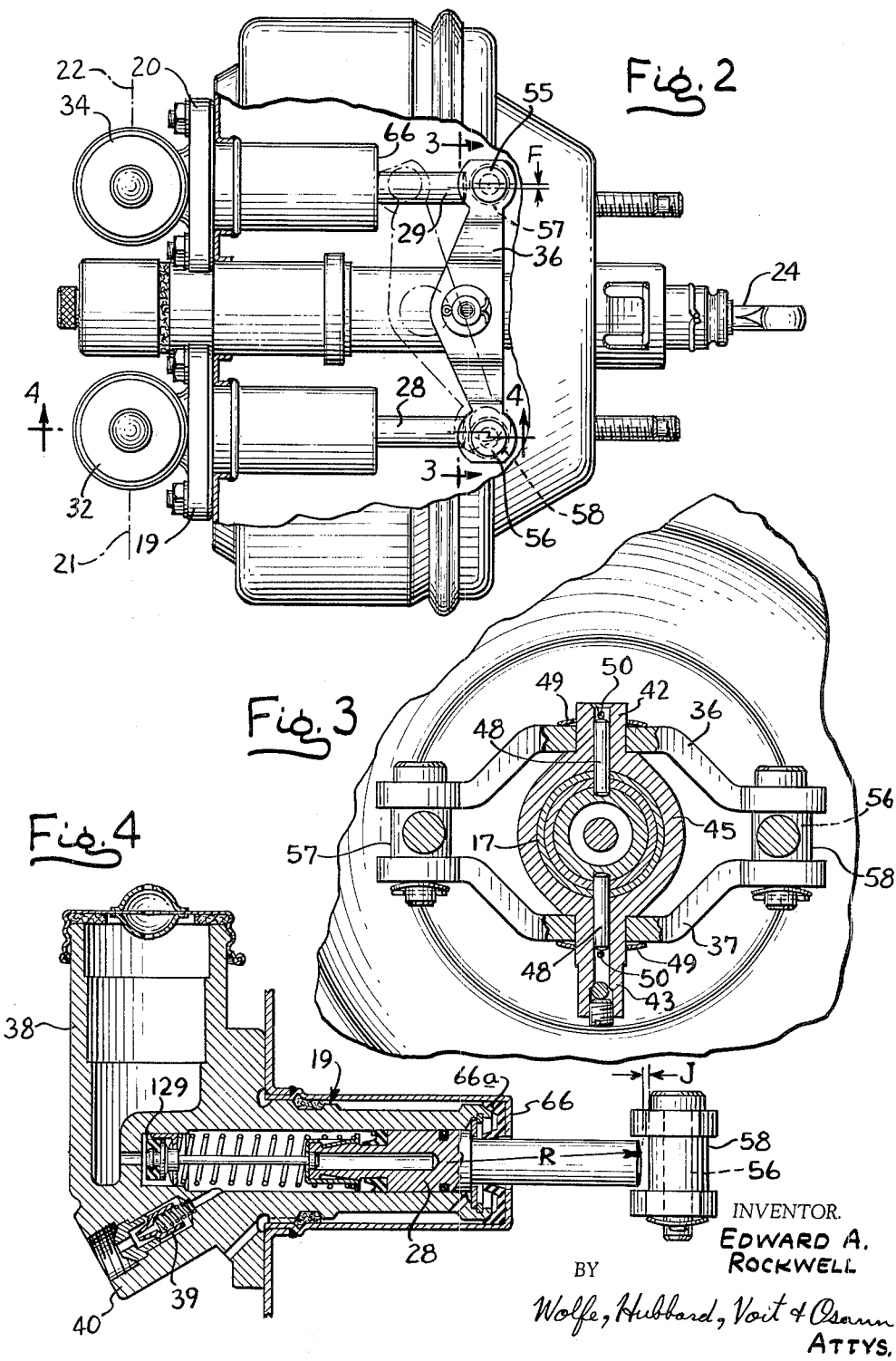

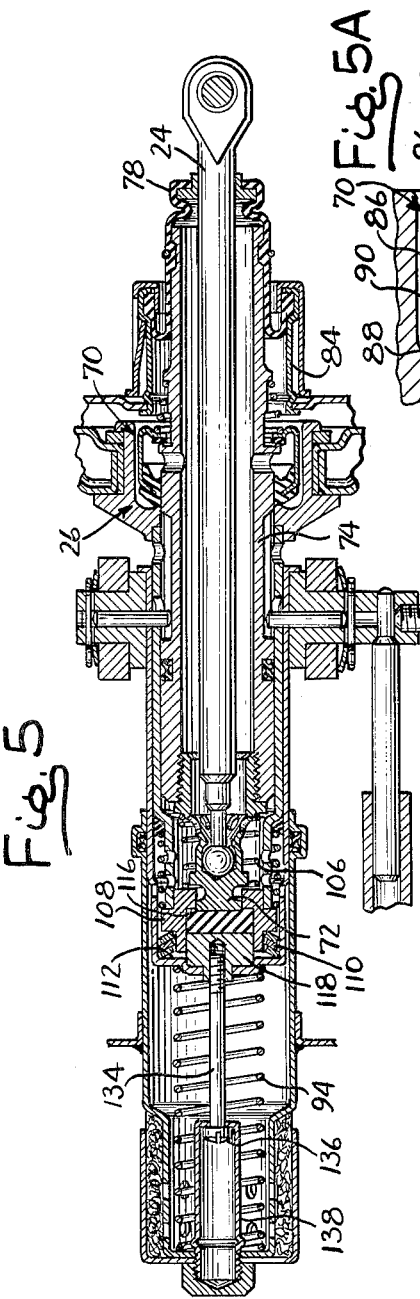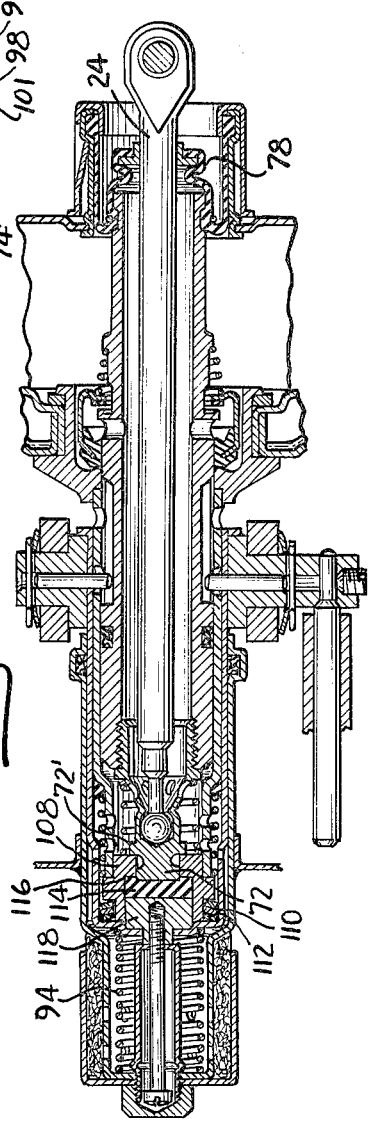

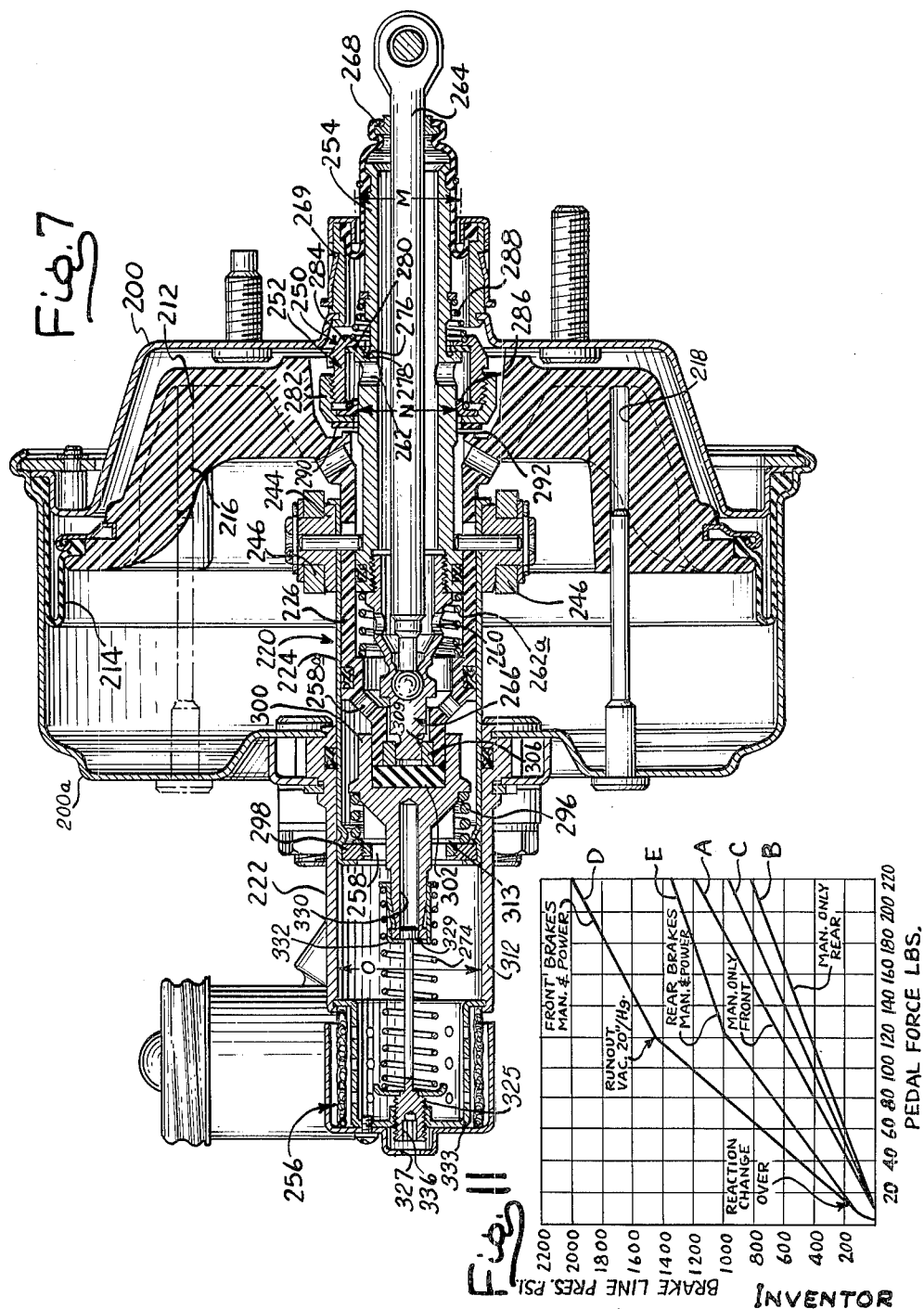

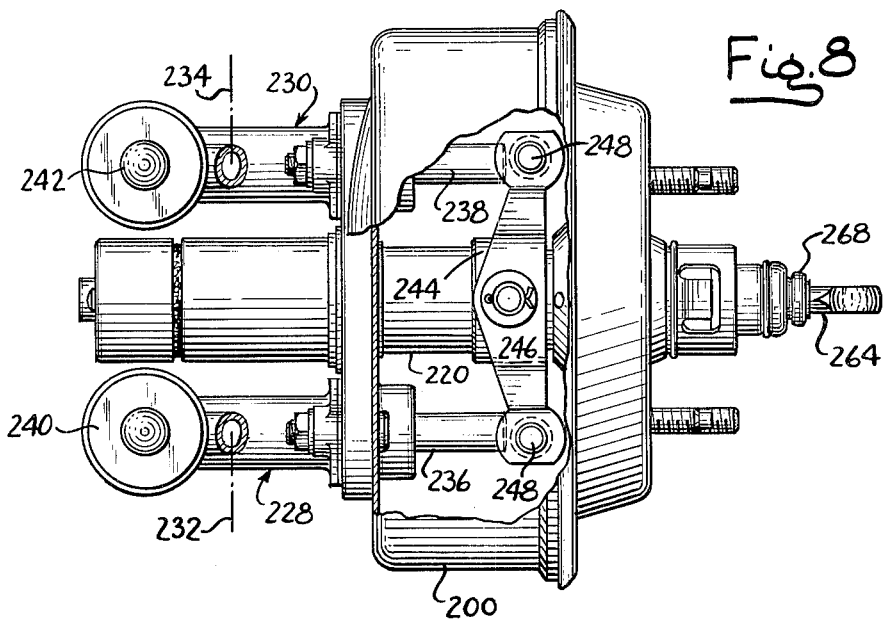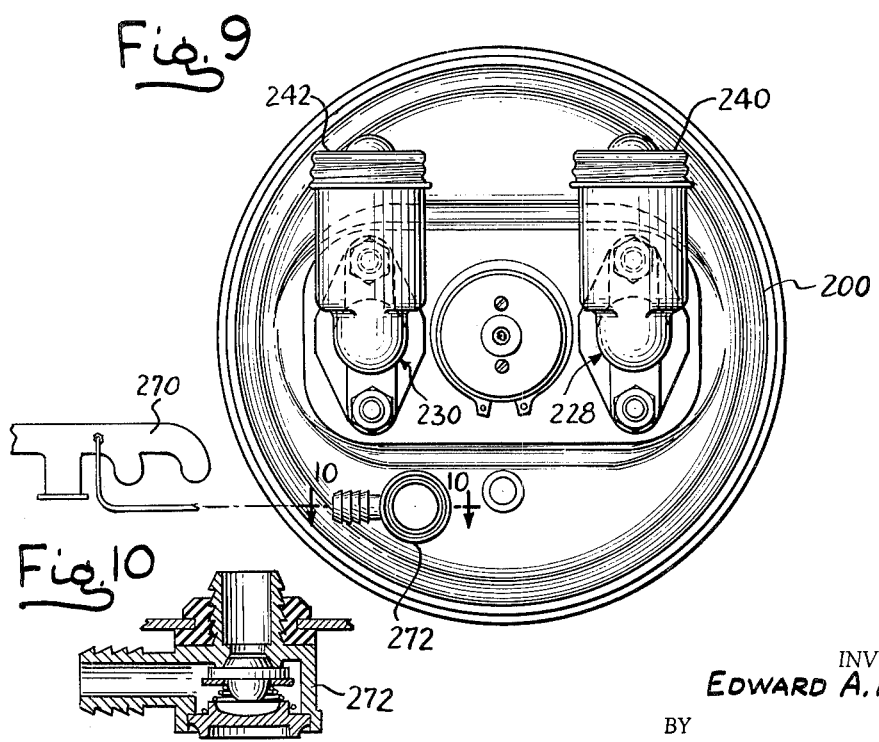

3,222,869
DUAL HYDRAULIC BRAKE SYSTEMS AND BRAKE
BOOSTER MECHANISMS THEREFOR
Edward A. Rockwell, 167 Ashdale Place,
Los Angeles, Calif.
Filed May 3, 1963, Ser. No. 277,832
21 Claims. (Cl. 60—54.6)

The present invention relates to improvements in dual hydraulic brake systems and brake booster mechanisms therefor.

In the commonly known one-line hydraulic braking system servicing all four wheel brakes of a motor vehicle, an extremely hazardous situation presents itself when, due to some hydraulic defect, the system loses its fluid, thereby causing the driver of the vehicle to experience a complete loss of brakes. To increase safety and reliability, and further to obviate this hazardous situation described, arrangements have been proposed for separating the hydraulic braking system into a dual system with one section for the front wheel brakes and another section for the rear wheel brakes. Thus, by subdividing the hydraulic system the latent hazards characterized by a complete loss of brakes in the common one-line hydraulic system are met in the event of some type of hydraulic failure in a portion or section of the hydraulic system.

One of the objects of this invention is to increase the safety and reliability of a dual hydraulic brake system by independently producing the hydraulic pressure in the separate brake actuating sections of the system. Another object is to construct and operate the means for producing the hydraulic pressures to satisfy the particular brake line pressure and fluid volume requirements of the different sections of a dual system, without increasing pedal range or losing pedal force.

A related object is to provide a brake booster mechanism for a dual system which, in the event of failure of one section of the system, transmits the required brake actuating hydraulic pressure to the remaining section of the system thereby to provide adequate braking action at the wheels.

A more specific object is to provide a dual system employing separate, different size master cylinders for connection respectively to separate sections of a brake system having different line pressure and fluid volume requirements, such as, for example, one section connected to disc type brakes on the front wheels and a separate section connected to drum type brakes on the rear wheels.

Still a further object is to provide a booster effective to transmit boosted manual force to dual master cylinders of a dual brake system.

Where braking is assisted by mechanical booster devices which boost the manual force to increase the pressure in the hydraulic system, it is desirable to transmit reaction force to the pedal such that the pedal action becomes progressively stiffer and the pedal has, therefore, realistic "feel."

A related object is to provide improved reaction means for a brake booster mechanism.

Another object of the present invention is to provide a brake booster mechanism for dual brake system sections with an improved and simplified means for transmitting a portion of the reaction force from independent sections of a subdivided brake system to the operating means for the booster mechanism, such as a brake pedal, which reaction transmitting means is effective even in the event of partial failure of one section of the system to provide a desirable gradually stiffer pedal.

Another object is to provide a brake booster with dual master cylinders which is constructed with a limited overall length such that it may be used as a replacement unit for conventional booster units with a single master cylinder, and thereby provides means for reconstructing an original one-line braking system in an auto or the like to a dual system with a minimum of mechanical and structural changes in the brake system and in the use of accessories and parts in the automobile.

A related object is to provide a power unit with a larger vacuum reservoir for safety without sacrificing compactness.

Another related object is to provide an off position adjustment for a brake booster which can be adjusted with the engine running and vacuum in the unit to compensate for distortion of the mechanical elements of the unit and thereby obtain a desirably close off position adjustment under operating conditions.

Other objects will become apparent in the following description when taken in connection with the accompanying drawings, wherein:

FIGURE 1 is a longitudinal cross sectional view through a brake booster mechanism for dual brake systems incorporating the features of this invention:

FIG. 1A is a horizontal cross sectional view through a manual actuating mechanism for dual master cylinders;

FIG. 2 is a top view of the brake booster structure of FIG. 1 with a fragmentary portion of the covering structure broken away;

FIG. 3 is a partial sectional view taken along lines 3—3 in FIG. 2;

FIG. 4 is a partial sectional view taken along lines 4—4 in FIG. 2;

FIG. 5 is an enlarged fragmentary cross sectional view illustrating the valve and reaction means of the booster shown in FIG. 1 with the power wall in an initial position with vacuum valve just closed;

FIG. 5A is an enlarged fragmentary detailed view of the valve means;

FIG. 6 is a view similar to FIG. 5 with the power wall in an advanced position and the air valve open;

FIG. 7 is a longitudinal cross sectional view through an alternative form of a brake booster mechanism for dual brake systems incorporating the features of this invention;

FIG. 8 is a top view of the brake booster structure of FIG. 7 with a fragmentary portion of the covering structure broken away;

FIG. 9 is an end view of the structure shown in FIG. 8;

FIG. 10 is an enlarged fragmentary sectional view taken along lines 10—10 in FIG. 9 showing a vacuum check valve and hose fitting; and FIG. 11 is a graph showing different curves representing output to input force for different master cylinder sizes for both manually operated master cylinders and power booster operated master cylinders.

While the invention will be described in connection with certain illustrated embodiments, it will be understood that I do not intend to limit the invention to these embodiments, but, on the contrary intend to cover such alternative embodiments, constructions and equivalents as may be included within the spirit and scope of the appended claims.

*Manually operated dual brake system without power assist*

Turning to FIG. 1A, the invention will be described first in connection with a dual brake system for automotive vehicles having dual master cylinders operable manually without power assist. As shown in this figure, separate master cylinders 1, 2 are provided for connection respectively to servomechanisms at the wheels for actuating the wheel brakes.

This dual system is especially suitable for automotive vehicles having different type brakes on the front and rear wheels, as for example, disc brakes on the front wheels and drum brakes on the rear wheels, an arrangement which combines the long life and superior braking power of disc brakes without excessive increase in cost over conventional four-wheel drum brake systems. Because brake line pressure and fluid volume requirements are different for disc brakes and drum brakes, however, there is a problem in satisfying the diverse requirements with the same master cylinders. Disc brakes require higher line pressure, desirably at least 1200 p.s.i., while drum brakes may require on the order of 800 p.s.i. maximum brake line pressure. The fluid volume requirements of disc brakes typically, however, are less than that for drum brakes because of the adjustment features of the former and absence of brake "fade."

Brake fade, brake line deflections, and related conditions experienced with drum brake operation tend to cause loss of pedal travel; that is, a portion of the travel of the brake pedal is required to displace sufficient fluid to overcome these conditions, leaving only the remaining portion of the pedal range for developing sufficiently high brake line pressure for producing the require braking force. These difficulties have limited the use of a short range pedal in drum brake systems since with a short range pedal, significant loss of pedal travel will interfere with proper brake operation.

Heretofore, to provide the fluid displacement required for safe operation of drum brakes, it has been customary to employ larger diameter master cylinders in the brake system such as, in most cases on passenger cars, of one inch diameter. A larger diameter master cylinder provides a lower hydraulic ratio (determined by the relative sizes of the master cylinder piston and the slave cylinder or servomechanism piston) necessitating typically a mechanical linkage between the pedal and the master cylinder (or power assist) which will provide a higher input to output force ratio to develop the brake line pressures required for brake operation.

Dual brake systems employing both disc type and drum type brakes have been proposed which, in order to satisfy the fluid volume requirements of the drum brakes, have entailed high displacement, large diameter, master cylinders arranged, illustratively, tandum with half-stroke pistons. Where in such dual systems for both disc type brakes and drum type brakes, the same diameter master cylinder is used to service both type brakes, the problem is complicated by the fact that the larger diameter master cylinder inherently provides a lower hydraulic ratio. To satisfy the higher brake line pressure requirements of the disc brakes of the system, power assist or high mechanical ratio pedal linkage mechanisms have been incorporated to provide the requisite output force. Such arrangements, however, practically preclude offering a short range pedal due to the problem of loss of pedal travel.

In accordance with the present invention, to overcome these problems and difficulties, it is proposed to employ separate master cylinders 1, 2 for a dual brake system including both disc type and drum type brakes, such master cylinders being of different size with a larger, higher displacement, master cylinder connected to the rear wheel drum brakes, and a smaller diameter master cylinder connected to the front wheel disc brakes. In this arrangement, to carry out the invention, the smaller diameter master cylinder 1 for the disc brakes provides the requisite brake line pressures required therefor by virtue of the higher hydraulic ratio which such master cylinder affords. In keeping with the invention, as shown in FIG. 1A, the master cylinders 1, 2 are connected for actuation by the pedal 3 so as to receive substantially equal actuating force therefrom. It is one of the features of this invention to incorporate a low mechanical ratio linkage between the pedal 3 and both master cylinders 1, 2, thus allowing a shorter range pedal to be used with complete safety of operation.

As shown in FIG. 1A, the separate master cylinders 1, 2 are carried in spaced parallel relation projecting forwardly from a mounting cup 4, which in this case, is adapted to be secured as shown in front of the fire wall. The master cylinder pistons 1', 2' project into the mounting cup 4 for operation by a pivotal lever mechanism 5 which is connected to the pedal. By means of this pivotal lever mechanism 5 the manual force from the pedal 3 is divided into substantially equal portions for application to the master cylinder pistons 1', 2'. For thus purpose, the pivotal lever mechanism includes arms 6 mounted in a whiffle-tree or equalizer wherein such arms straddle axially movable actuating means herein shown as a rod 8 which is slidably received in a sleeve 9 on the mounting cup 4, and are pivotally connected thereto along the center axis of the unit, which is between the master cylinders, and intermediate the ends of the arms. For convenience in illustration, in the horizontal sectional view of FIG. 1A the pedal is shown pivotally mounted to the bracket 7, which is broken away to indicate that the pedal is shifted 90° from its actual arrangement movable in a vertical plane rather than in the horizontal plane as shown.

The arms of the lever mechanism are connnected by pins 11, 12 at each end, each pin having a hollow sleeve 11', 12' which spaces the arms and provides bearing surfaces against which the master cylinder plungers are engaged. The pedal 3 in this case is pinned to the actuating rod 8 which is connected to the arms 6 of the lever mechanisms intermediate their ends. The forward end of the actuating rod is slidably mounted in the sleeve 9, thus guiding the motion of the actuating rod. A light return spring 13 seated at its forward end against means 13' for adjusting the off position of the mechanism and abutting the lever arms 6 tends to return the mechanisms, including the brake pedal, to the "off" or retracted position which is obtained with the master cylinder pistons fully retracted.

The input force from the pedal acting intermediate the ends of the arms will in usual operation be divided equally by the arms between the master cylinder pistons, the lever arms 6 acting as levers of the second class. It will be noted that the pedal is pivoted at its upper end to a bracket 7 fixed to the fire wall, and the actuating rod 8 connected to the lever mechanism is pinned to the pedal 3 substantially intermediate its ends. Thus, the pedal 3 acts as a lever of the third class, providing in this case a 3½:1 input to output force ratio. It will be seen that 1:2 ratio is afforded between the input force applied to the lever mechanism and the output force applied to each master cylinder piston thus providing an overall 1¾:1 mechanical ratio between the pedal and the individual master cylinder pistons.

Since the master cylinders 1, 2 are completely separate, their sizes may be selected to suit the requirements of a particular brake system, and different size master cylinders may be used as shown where the plunger 1' for one master cylinder 1 is smaller than the plunger 2' for the other master cylinder 2. Referring to FIG. 11, performance curves are shown for different size master cylinders. Curve A depicts as a straight line, brake line pressure versus pedal force for a ⅝" diameter master cylinder, suitable for operation of disc type brakes, since it provides maximum 1200 p.s.i. brake line pressure at maximum pedal force. Curve B depicts also as a straight line, brake line pressure versus pedal force for a ¾" diameter master cylinder, suitable for operation of drum type brakes, since it provides a maximum 800 p.s.i. brake line pressure at maximum pedal force. Curves A and B thus depict the operation of the unit of FIG. 1A with a ⅝" master cylinder 1 for connection to the disc brakes on the front wheels of the vehicle, and a ¾" master cylinder 2 for connection to the rear wheel drum brakes of the same vehicle, in a dual brake system. Curve C depicts performance of a 11/16" master cylinder which could be used in the unit of FIG. 1A to replace one inch master cylinders single or tandem on four wheel drum brake systems now in use. The above sizes and performance characterizations are exemplary only, however.

In a dual brake system as above mentioned, the disc brakes 14 for the front wheels will thus operate most efficiently with a shorter range pedal, a lower mechanical ratio linkage, and a sufficiently higher hydraulic ratio because of the smaller diameter master cylinder 1 to provide the needed brake line pressures for safe disc brake operation. The drum brakes 14a on the rear wheels are also operated most efficiently with a shorter range pedal, a pedal linkage having lower mechanical ratio, and a higher displacement larger diameter master cylinder 2 to displace the required fluid volume to overcome brake fade and other typical conditions of drum brake operation.

The relation between pedal force and the force to operate the brakes is theoretically the ratio of the linear travel of the pedal to the average travel of all the actuators used to apply the brakes, i.e. in a hydraulic system this overall ratio is the product of the mechanical ratio to the master cylinders, and the hydraulic ratio. The hydraulic ratio is the area of all the wheel cylinder pistons connected to a given master cylinder divided by the area of such master cylinder piston. It will be recognized, therefore, that the limitation to the selection of the hydraulic ratio is the permissible pedal travel, since any system must comply with a specified pedal travel requirement.

In practice there are losses of pedal travel which also must be considered in complying with a specified pedal travel, due to various factors, such as:

(1) Distortion of the brake parts and allowance for initial clearance (constant with automatic adjustment) but a minimum generally equal to twice the distortion and expansion from heat in the brake drum.

(2) Allowance must be made for compression of the brake fluid and especially where in practice there may be as much as 0.5 percent of included air in the brake fluid.

(3) The distortion of the master cylinder tubing rubber seals, cups and hoses.

For the same overall ratio the smaller the area of the master cylinder piston to that of the wheel cylinders (the larger the hydraulic ratio) the lower the required mechanical ratio from the pedal.

In practice, losses of pedal travel become disproportionately greater as larger size master cylinders are used due to the greater distortions which are the effects of factors 1 and 3 above. Heretofore, tandem master cylinder constructions have been used in dual brake systems. With such tandem master cylinders, the hydraulic ratio is typically lower due to the arrangement where one of the master cylinders hydraulically pushes the tandem piston requiring larger size master cylinders (for example of one-inch diameter) to provide the requisite brake fluid displacement, and entailing longer pedal travel at comparable pedal forces, because each piston in effect is only half stroked. Therefore, markedly reduced pedal travel losses become a surprising result of the present invention where two separate master cylinders are utilized in a dual system each having the required displacement for its own use and providing such displacement by means of full stroked smaller diameter pistons. In keeping with the present invention, higher hydraulic ratios are utilized to provide less loss of pedal travel for the same brake line pressures.

It will also be noted that being independently operated, one master cylinder of the unit of FIG. 1A continues in operation to actuate the brakes of one section of the dual system even in the event of loss of fluid and failure of the other section of the system. In such event, upon initial movement of the pedal 3, the pivotal arm structure 6 will cock and advance the slack master cylinder piston either until reaction opposes further movement or to the limit of the stroke with the arms 6 abutting the end of the master cylinder casing. Thereafter, both pistons will be advanced by the pivotal arm structure or, with one piston presenting no reaction, the operative piston will be advanced by the pivotal arm structure which swings about the fulcrum at the end seated against the master cylinder casing having the nonworking piston.

How the foregoing principles are applied to dual brake systems with brake booster units for power assist will now be explained in connection with alternative forms of booster units shown in FIGS. 1-6 and 7-9, respectively.

*Dual brake system with Booster Unit FIGS. 1-6*

Referring to FIG. 1, a power booster unit constructed according to a preferred form of the invention is formed with a casing 15 having a movable power wall 16 operating axially movable actuating means herein shown as including a tubular output member assembly 17 slidably mounted in a sleeve 18 fixed to the front end of the casing along the center axis of the unit. The actuating means is connected to a pair of master cylinders 19, 20 (FIG. 2) which apply pressure to fluid in lines (FIG. 1A) leading to the mechanism for actuating the vehicle brakes 14, 14a on the front and rear wheels respectively. The unit is actuated from a brake pedal or the like through a linkage including a rod 24 which extends into the casing from the right side as viewed in FIG. 1 and is included in the actuating means.

Within the casing 15 the movable power wall 16 operable by a differential pressure applied on opposite sides of the wall 16 produces the power assist for operating the master cylinders. The casing 15 is connected to a source of vacuum such as the intake manifold of a vehicle engine. In the present case, the movable wall 16 is vacuum suspended, that is, in the retracted position of the wall 16 the casing 15 is evacuated on both sides of the wall. By valve means 26 actuated by the control rod 24, air is admitted into the casing 15 behind the wall 16 to provide the differential pressure for producing the output force operating the master cylinders. In keeping with the present invention, the valve means 26 is of the self-lapping type characterized by successive movements of the wall and the valve means 26, which in the present case is carried by the wall 16, caused by successive movements of the control rod.

In accordance with one of the major features of the invention, output force of the brake booster unit is transmitted to plungers 28, 29 of the pair of master cylinders 19, 20, respectively, which as shown in FIG. 2 are buried within the casing 15 having their forward brake fluid reservoir sections 32, 34 projecting only a short distance beyond the front outside wall of the casing so as to provide a particularly compact unit and limited overall length which is kept to a minimum while providing a substantial casing volume to serve as a vacuum reservoir.

The output force from the movable wall 16 and output member assembly 17 is transmitted to the plungers of the master cylinders via arms 36, 37 pivotally mounted in a whiffle-tree type or equalizer mechanism wherein, as shown in FIG. 3, such arms straddle the tubular output member assembly 17 and are pivotally connected thereto along the center line of the booster unit and intermediate the ends of the arms 36, 37. The extreme ends of the arms are connected such that the arms operate together, and are pivotally carried by the output member assembly so that the arms are free to pivot. The arm structure normally engages both plungers 28, 29 simultaneously causing each to enter its respective master cylinder. In order to more fully understand the operation of the pivotal arm equalizer structure, FIG. 4 shows one end of the arm 36 as it engages the plunger 28 of the pictured illustrative master cylinder 19. Preferably, the end of the plunger is curved with a minimum radius R for stability in operation of the plunger.

The master cylinder shown in FIG. 4 slidably receives the plunger 28 which is effective upon forward movement to displace hydraulic fluid received from the reservoir 38 through a residual pressure check valve 39 in the discharge fitting boss 40 providing for the conventional fitting to the particular brake line, which in this case, supplies brake fluid to the rear wheel brakes as shown in FIG. 1A. It will be understood that the companion master cylinder 20 is similarly constructed and is connected to the brake line leading to the front wheel brakes. As explained in connection with FIG. 1A, the two master cylinders 19, 20 may be of the same or of different diameters to suit the brake line pressure and fluid volume requirements of the particular type brakes to which they are connected. Referring to FIG. 11, the performance characteristics of ⅝" and ¾" diameter master cylinders are given by curves D and E, respectively, where such size master cylinders are employed in the power booster unit of FIG. 1, for actuation of front wheel disc brakes and rear wheel drum brakes in a dual system. The theoretical pedal force is based on a mechanical ratio of 3½:1 for this example.

Referring to FIG. 3 for further details of the pivotal arm equalizer mechanism, it will be seen that this mechanism comprises a pair of arms 36, 37 which are pivotally supported by projections 42, 43 extending upwardly and downwardly, respectively, from an annular collar 45 which is received about and is fixed to the output member assembly 17 by means such as pins 48 and the flange on the end 48a of the output member assembly 17. The arms are held in position by washers 49 and cotter pins 50. Clevis pins 55, 56 connect the arms 36, 37 together straddling the collar 45, each pin having a hollow sleeve 57, 58 which spaces the arms 36, 37 and provides bearing surfaces against which the master cylinder plungers 28, 29 are engaged. This pivotal arm structure provides a particularly advantageous means for transmitting the output force from the output member assembly 17 of the brake booster unit to the master cylinder plungers and in turn transmitting the reaction force back therefrom to the unit.

Force is transmitted from the movable power wall 16 to the equalizer arms 36, 37 by means of the output member assembly 17. This assembly includes an outer member 59 which is fixed to the mounting collar 45 for the arm structure and is herein referred to as a pull member because of its function to pull the arm structure forward upon advance of the power wall, and an inner member 60 which is telescoped with the pull member 59 and is fixed to a mounting element 62 carried at the center of the movable power wall 16, serving as a push member upon advance of the power wall. While the push and pull members 60, 59 of the output member assembly 17 have limited relative push and pull movement for reaction transmitting purposes to be later described in detail, they can be considered as operating together.

In the present instance, forward movement of the wall 16 causing the push element 60 to move forwardly, is transmitted via the reaction transmitting means 64 to pull the outer member 59 ahead in the casing 15, which pulling force via the pivoted arms 36, 37 will advance the master cylinder plungers 28, 29 forwardly in their respective master cylinders.

One of the features of this arrangement for transmitting force to the master cylinder plungers arises from the operation in the event of fluid loss in one system section. Referring to FIG. 2, it will be clear that with both master cylinders 19, 20 operating in normal fashion, and the brake lines 21, 22 connected thereto filled with fluid, the output member assembly 17 being connected to the center arms 36, 37 moves the arm structure lengthwise of the casing upon movement of the power wall without causing the arms to pivot or cock so long as the resistance offered by the master cylinder plungers is substantially equal and is equally applied as reaction force to the opposite ends of the arms. In the event that one brake line loses fluid so that the resistance to movement offered by one master cylinder plunger is substantially less than the resistance offered by the other, movement of the power wall 16 and output member assembly 17 will pivot one end of the arm structure forwardly with the other end of the arm structure bearing against the working plunger remaining in its back position, as shown in dotted position in FIG. 2. In such case, the end of the arms 36, 37 bearing against the plunger 29 offering little or no resistance advances in the casing to its limit position with the arms 36, 37 abutting the end wall 66 of the master cylinder. Continued movement of the power wall swings the arm structure to advance the working master cylinder plunger 28, it acting now as a lever of the second class having its fulcrum at the end stopped against further advance by abutment against the master cylinder end wall 66, force from the power wall 16 being applied to the lever arms 36, 37 intermediate their ends and force being transmitted at the retracted end of the arms to the working master cylinder plunger 28. It will be observed that the point of contact between either end of the lever arm structure and the abutting master cylinder plunger changes gradually over the range of motion of the arm in the event that it swings between the extreme positions shown in FIG. 2. To account for this changing relationship, the vertical center line of the pins 55, 56 at the ends of the arms is spaced slightly outside by the distance F of the horizontal center line of the master cylinder plungers, so that the point of contact with the plungers will remain in substantial alignment with the plungers over the full swing of the arms.

*Valve mechanism and reaction means*

As noted above, one of the features of the invention is reaction means which provides realistic feel to the foot pedal or other actuating device for the booster unit. The reaction means is effective to transmit a gradually increasing proportion of the total reaction force from the output member assembly 17 to the actuating rod 24 for the unit, this actuating rod being adapted to be connected to the foot pedal or some other operating element. Referring to FIG. 11, it will be seen from curves D and E that the power booster unit provides an initially high boost ratio which gradually decreases in the reaction change-over region to a lower boost ratio which is maintained over the remaining range of operation of the power booster unit to run-out of the vacuum. In the event of failure of the vacuum, and after power run-out, a direct connection between the actuating rod 24 for the unit and the master cylinder plungers 28, 29 affords means for direct or manual actuation of the master cylinders without power boost. Further, in the event of partial failure of vacuum, some boost of the manual force will assist in operation of the master cylinders. It is also, in this connection, to be noted that by burying portions of the master cylinders 19, 20 within the power booster casing 15, the total volume of the casing is increased without extending the length of the unit which demonstrates the important result obtained by combining this master cylinder configuration with a vacuum power unit. Where the unit is applied to an automotive vehicle for example, this provides a vacuum reservoir which is available as a reserve power source, while still permitting this power booster unit to fit within the crowded space ahead of the fire wall where such units are conventionally mounted.

Turning to FIGS. 1, 5, 5A and 6 for details of the valve mechanism and reaction means, the valve means 26 provides a balanced air and vacuum valve as by means of the annular grommet 70 at the center of the wall 16, and cooperating valve elements. The balanced valve means 26 is actuated by the actuating rod 24 which extends along the longitudinal center axis of the power unit and is fixed at its inner end to a reaction plunger 72 which, in turn, is fixed to a hollow air conduit member 74 telescoped within the output member assembly 17 and serving as a conduit for air from the air filter 76 to the valve means 26 of the booster unit. Foreign matter and air is excluded from the actuating rod side of the unit from entry into the air conduit member 74 by a boot 78 and gasket 80. The arrows at the left end of the unit leading from the air filter 76 through an annular passage 82 around the output member assembly 17, and through ports 84 in the various elements, show the air flow path to the air conduit member 74. Forward movement of the actuating rod 24 causes the air conduit member 74 to be advanced, such elements being rigidly connected.

The valve means 26 of the present invention incorporates certain improvements to the balanced, grommet type valve means disclosed in my prior United States Patent No. 2,667,861, granted February 2, 1954. In the present case, the valve means 26 is substantially balanced with a slight unbalance due to the difference in effective areas F' minus G' of the valves and the actuating means. The valve springs 102, 106, however, are selected to provide a force sufficient to overcome the slight unbalance and thereby to insure either the opening or the closing of the valves upon actuation. Therefore, the minimum initial load on the vacuum valve return spring 106 is just great enough to return the member 74 at the highest pressure differential encountered in service and which acts on the area difference F' minus G'.

In connection with the actuating means, one end of the boot 78 is fixed to a tube 85 projecting from the casing 15 and is folded so as to present an effective area G to air pressure at the input or right-hand end of the actuating rod, thereby balancing any tendency of the actuating rod to move due to air within the valves and acting on the effective area F', F' and G' being substantially equal areas.

In carrying out the invention, the valve means 26 for controlling the differential pressure on the opposite sides of the power wall 16 is arranged at the center of the wall and operates in cooperation with the air conduit member 74. Said valve means 26 includes the grommet 70 comprised of an annular metal element 86 carrying at its forward end a ring 87 of resilient material such as neoprene in which the end of the metal element is embedded. The outer forward surface presented by the resilient ring in cooperation with a valve seat 88 just ahead of the ring presented by the rear edge of the mounting element 62 carried by the power wall 16, provides a vacuum valve and controls communication between the opposite sides of the wall via a passage 90 through the wall between the mounting element 62 and the grommet 70.

The valve means 26 is shown in the off position in FIG. 1 with the vacuum valve open and both sides of the power wall in direct communication. The casing 15 on the forward side of the power wall 16, it will be recalled, is connected to a source of vacuum such as the vehicle engine intake manifold through means such as a fitting having a check valve 92 similar to FIG. 10. With the valve means 26 for the booster unit in the off position, a light return spring 94 acts to urge the power wall 16 to its retracted position assisted by a piston effect due to the arrangement of the output member assembly 17 whereby the annular area H–G is exposed to vacuum from inside the casing, such that air from outside the casing tends to urge the output member assembly 17 and power wall 16 in the return direction. It will be noted that with the arrangement disclosed where the inner ends of the master cylinder pistons 28, 29 are exposed to vacuum within the casing 15, force due to the air pressure outside the casing acting on the effective area of the master cylinder pistons 28, 29 tends to return the master cylinder pistons 28, 29 and assists the main return spring 94 and the piston effect associated with the output member assembly 17 to return the power wall and mechanisms carried thereby. This permits a light return spring 94 to be used so that the unit is operable manually in the event of power failure more easily.

In addition to the vacuum valve, the valve means 26 provides an air valve for controlling the admission of air to the casing space behind the power wall 16 to produce the differential pressure for moving the wall. The air valve in the present case is provided between a valve seat 96 carried by the air conduit member 74 and the grommet 70. Said valve seat 96 is formed by a circumferentially slightly projecting flange 98 which has a rear surface facing and cooperating with a resilient annular washer 99 carried by the grommet 70 to form the cooperation elements of the air valve. The grommet 70 is slightly unbalanced, as above noted, with air valve and vacuum valve having substantially equal effective areas F'. Radial passages 101 through the wall of the tubular air conduit member 74 convey air to inside the grommet 70 and the supply of air therefrom to the casing region behind the power wall 16 is under the control of the air valve. A light spring 102 seated at one end against a ridge 104 on the tubular conduit member 74 and at the other end against the grommet 70 tends to urge the grommet air valve washer 99 against the air valve seat 96 on the tubular member such that the grommet is carried with the tubular member upon movement thereof by the actuating rod.

In the off position of the valve means, in which position it is depicted in FIG. 1, the air valve is closed to block air flow to the casing space behind the power wall, while the vacuum valve is open such that said space behind the power wall is evacuated and the power wall is suspended in vacuum. How the valve means 26 operates to control the differential pressure will be clear upon consideration of FIGS. 1, 5, 5A and 6. This valve means is of the self-lapping type, that is, upon successive movement of the actuating rod 24, air admitted behind the power wall 16 advances the latter, tending to move the valve elements to the lapped position (FIG. 5A) wherein both the air valve and vacuum valve are closed and the power wall is held stationary in this hold position. Thus upon initial movement forwardly of the actuating rod 24 from the off valve position of FIG. 1, the grommet 70 is carried forward with the air conduit member 74 to seat the forward surface of the ring 90 on the grommet 70 (as shown in FIG. 5) against its cooperating valve seat 88 on the mounting element 62 carried by the power wall. Further movement of the actuating rod 24 will advance the air valve seat 96 of the grommet washer 99 and thereby unseat and open the air valve, as shown in FIG. 6, to admit air to the casing behind the power wall, whereupon the power wall advances. The power wall will advance to move the valve means grommet 70 in its self-lapping action to close the air valve by moving the grommet washer 99 ahead onto its seat 96, both air and vacuum valves then being closed as shown in FIG. 5A in the lapped position of the valve means 26. It will be clear that successive increments of movement of the actuating rod 24 will open the air valve to cause successive increments of movement of the power wall as the air pressure behind the power wall increases, producing the differential pressure tending to advance the wall.

Initial increments of movement of the actuating rod 24 from the off position of the valve means to the lapped position, with the power wall retracted in the casing, are opposed by a light reaction and valve return spring 106 and a bumper of resilient material 114 effective against the forward end of the actuating rod, as shown in FIG. 5. This provides an initially light reaction force opposing pedal action and a high boost ratio determined by the rate of the reaction spring 106 and relatively low reaction from the resilient member 114.

As the power wall advances upon successive increments of forward movement of the actuating rod 24 and valve means 26, the reaction means, according to the present invention, transmits a progressively greater portion of the total reaction force from the master cylinder plungers to the actuating rod 24 and thence to the foot pedal, the remaining portion being applied to the power wall 16.

For this purpose, the reaction plunger 72 at the forward end of the actuating rod 24 which is an element of the reaction means, is slidably received in a rigid reaction ring 108 movably carried within the forward end of the output member assembly 17.

The reaction ring 108 is carried by the push element 60 of the output member assembly 17 and is spaced from the pull element 59 of the assembly 17 by a plurality of nested annular spring washers 110 thus affording the relative movement between the outer and inner elements 59, 60 previously referred to. Said spring washers transmit the reaction force from the outer element 59 to the inner element and, as will be noted by comparing FIGS. 5 and 6, when the reaction force becomes greater upon forward movement of the power wall 16 these washers are compressed, reducing the spacing between the reaction ring 108 and the end wall 112 of the outer element 59 of the output member assembly. Since the actuating rod 24 is slidably received within the output member assembly, a portion of the total reaction force is transmitted to the actuating rod, at least during initial stages of operation of the wall 16, as shown in FIG. 5, through the light reaction spring 106, the remaining portion of the reaction force being transmitted directly to the power wall through the member 60 and through the resilient member 114.

In advanced stages of operation, according to the present invention, the reaction force is divided between the power wall and the actuating rod 24 and transmitted through the resilient bumper. For this purpose, the reaction ring 108 receives the plug or bumper 114 of resilient material which is held in place against a shoulder 116 in the reaction ring by a cylindrical stop element 118 which in turn abuts the inturned end 112 of element 59 of the output member assembly.

In keeping with the invention, upon successive increments of movement of the power wall and increase in reaction force, the face or end of the reaction plunger 72 engages the resilient reaction plug 114 such that a portion of the total reaction force is transmitted through the resilient plug to the actuating rod 24 according to the area of the face of the reaction plunger. The resilient, compressible plug being confined acts like a body of liquid under pressure to distribute the force between the plunger 72 and the annular surface 116 of the reaction ring 108 facing the plug. The plug is fitted within an enclosed space in the reaction ring 108, and is placed under gradually increasing compressive force by the cylindrical stop 118 since the resilient plug is between the latter and the push element 60 of the output member assembly, and thus effectively between the component members 59, 60 of that assembly. The spring washers 110 are also between these component members 59, 60 and thus these washers are progressively compressed as the output force from the booster unit increases upon advance of the power wall 16 in the casing and acts as a means modifying the transmission and distribution of force through the reaction plug or bumper 114. With the resilient plug 114 being gradually compressed as the power wall advances, the reaction plunger 72 encounters increased resistance to forward movement and thus gives the effect to the actuating rod 24 of a gradually greater reaction force, the result with the deflection of the spring washers 110 being to transmit a gradually increasing portion of the total reaction force to the actuating rod and thus to the pedal. As shown in FIGURE 6 which depicts the power wall 16 in an advanced position, following the stage of operation shown in FIGURE 5 where the end of the reaction plunger 72 engages the bumper 114, the radial shoulder 72' on the reaction plunger 72 engages the reaction ring 108 such that in this second stage the ring 108 is carried forward with the reaction plunger against the reaction plug and the spring washers 110, and in this advanced stage of operation the plug serves effectively as a rigid element for transmitting reaction force to the actuating rod. Conversely, the actuating rod 24 feels stiff, there being a direct virtually rigid connection from the rod to the output member assembly 17 for direct actuation of the master cylinders, as for example, after power run-out or in the event of power failure.

*Additional features*

Among the other features of the invention, are those which are directed to overcoming problems in the manufacture of the unit, or in the installation or servicing of the unit. From FIGURE 1 it will be noted that in this embodiment of the invention, the power wall 16 is formed of two annular dished metal pieces reinforcing each other with suitable weldments, as at 120b, and carrying the output member assembly 17 forwardly projecting from the mounting element 62 at its center by way of the tube 60 which may be brazed to the element 62. Radial ribs 120 and 120a increase the strength and rigidity of the power wall and the aperture 16a on the vacuum side through the ribs 120 opens the space between the wall pieces as further vacuum reservoir. A flexible skirt 122 fastened to the outer edge of the wall 16 is received at the joint 124 between casing sections to facilitate manufacture and to permit disassembly and the two halves after allowing for compression of the bead of the diaphragm are arranged to abut at 124a so as to maintain dimension limits and will gradually take the vacuum section force at this point. The power wall 16 is indexed for assembly purposes and for assuming proper position by one or more indexing pins 126 which in this case are supported by the collar 45 and slidably received in a guide member 128 fixed to the forward end of the wall.

As another feature of the invention, means are provided for adjusting the off position of the power wall 16 while the engine is operating and the unit is connected to the intake manifold vacuum and subject to the distortion producing effects of vacuum in the casing 15. The problem has been experienced with prior units that in operation the brakes fail to release in the off position of such units due to distortions and deflections. In the present case, means is provided for adjusting the retracted position of the power wall 16 and mechanisms carried thereby to maintain clearance J as shown in FIGURE 4 in the off position. It will thus be seen that adjustment is provided to insure that the master cylinder pistons fully retract in the off position to permit the master cylinder check valve 129 to open and release the fluid in the brake lines. For this purpose, the stop element 118 of the reaction means has a square or hexagonal projection 130 which fits in a similarly shaped opening in the forward end 132 of the element 59 of the output member assembly. The output member assembly 17 and the power wall 16 are urged to the right in FIGURE 5 to a retracted position by the return spring 94. This return position is determined by means herein shown as a threaded adjustment screw 134 received in the stop element 118 and held at the head 136 of the screw by a mounting tube 138 which has its end turned to provide a shoulder 140 against which the head of the screw seats while the screw is longitudinally slidable through the end opening in the tube. This tube 138 also provides access to the head 136 of the adjustment screw which is slotted so that it may be turned (the stop element 118 being held against turning) to position the outer member assembly 17 lengthwise. A cap 141 over the end of the mounting tube 138 guards against entry of air and other matter while the length of the tube is sufficient to allow the screw to move without interference as the power wall 16 moves. To change the off position of the power wall 16, as for example should the master cylinder pistons fail to fully retract, the output member assembly 17 and the wall may be adjusted to the left in FIGURE 1 by turning the adjustment screw 134 in the appropriate direction. Turning the adjustment screw in the opposite direction will adjust the power wall in the opposite direction. It will be noted that the valve parts are changed in position by such adjustment but that the pins 48 which couple the equalizer mechanism to the output assembly 17 enter longitudinal grooves 150 in the air conduit member 74 and in the off position of the unit abut the ends of these grooves to fix the valve clearances.

A further feature of the present invention has to do with servicing the master cylinders of the manually operated unit of FIGURE 1A or the power booster units of FIGURES 1–10. Mounted on the front of the mounting cup or power wall casing completely independent of each other, either master cylinder may be repaired or parts replaced without touching the other. Since the sections of the system are independent, the wheel brake servomechanisms and master cylinders of one section may be repaired or service and the brake lines thereto bled and filled with fluid without effect on the other section.

A further feature of my invention is the guiding of the rod 24 in the pull member 59 in the forward section of the unit and the absence of any guiding in the back section. As a result there is no requirement for exact alignment of the two halves 15 and 15a comprising the power unit casing and this feature makes possible the sensitive balancing of the valve and the use of minimum return spring 94 force, which would otherwise work against the operator in case in case of failure of the vacuum. Furthermore, the total angularity of the push rod 24 is a minimum even for full on operation of the unit, due to the unique arrangement of the push-pull members 60, 59 and the rod 24 reaching into the member 59.

Alternative embodiment

An alternative form of a power booster unit constructed according to the present invention is shown in FIGURES 7–9. Referring to these figures, it will be seen that the power booster unit has a similar construction to the embodiment of the invention illustrated in FIGURE 1, and thus comprises a casing 200 having a movable power wall 212 connected at its periphery to a diaphragm skirt 214 which is fixed to the outer wall of the casing by a bead clamped between the sections 200, 200a of the casing. The power wall 212 in the present case comprises a dished annular member which may be molded plastic material with ribs 216 to reinforce the wall, and is shown with a longitudinal bore 218 to receive an indexing pin fixed to the casing for maintaining the power wall against rotation and guiding the same in its longitudinal movement in the casing and upon assembly of the parts.

The power wall 212 operates a tubular output member assembly 220 slidably mounted in a sleeve 222 fixed to the front end of the casing and extending forwardly therefrom to receive the output member assembly. This output member assembly includes an outer member 224 slidably received with the mounting sleeve 222 and an inner member 226 telescoped therein, the inner member 226 being in the present case molded as an extension of the power wall 212.

The power wall 212 is operative via the output member assembly 220 to actuate a pair of master cylinders 228, 230 (FIG. 8), each connected to brake lines 232, 234 leading to brake actuating servomechanisms. Thus, in the present case, the power booster unit operates a dual brake system, or dual sections of a brake system. Thus, one master cylinder 228 is connected by a brake line 232 to the actuators for the front wheel brakes, which as pointed out above may be disc type brakes, while the other master cylinder 230 is connected similarly to another line 234 to the actuators for the rear wheel brakes of the vehicle which may be drum type brakes. The master cylinders 228, 230 in the present case are bolted to the outside of the casing 200 and instead of conventional push rods include plungers 236, 238 and conventional cylinders 230 and 228 with reservoirs 240, 242 whereby upon advance of the plungers in the master cylinders, fluid received from the reservoirs is placed under pressure and moved into the brake lines. By having the master cylinders mounted on the outside of the casing as illustrated in FIGS. 7 and 8, as distinguished from burying a portion of the master cylinders within the casing as shown in FIG. 2, it is possible to employ conventional master cylinders with no special provision for mounting as will be required with the master cylinders employed in the unit illustrated in FIG. 2.

In keeping with the invention, provision is made for independent actuation of the master cylinders. For this purpose, the output member assembly 220 carries a pivotal arm structure (FIGS. 7, 8) by means of a collar 244 pinned to the outer element of the output member assembly. This pivotal arm structure is substantially the same as that shown in FIG. 3 in connection with the first embodiment of the present invention, and hence, the description thereof will not be repeated. It will suffice to state that the pivotal arm structure includes arms 246 straddling the tubular output member assembly and collar 244 supporting the arms thereon, the ends of said arms 246 being connected by pins 248 or the like and acting against the exposed ends of the master cylinder plungers 236, 238. Thus upon movement of the power wall 212 ahead in the casing 200, with both brake lines 232, 234 filled with fluid, the pivotal arm structure will be effective to transmit force from the power wall 212 substantially equally to the master cylinder plungers without cocking or pivoting of the arms 246. In the event that one brake line loses fluid, the plunger of the master cylinder connected thereto will offer substantially less reaction force and the arm structure will cock to take up the slack in the system and thereafter will evenly advance both master cylinder plungers. It will be noted that if there is a complete failure of one brake line section, one end of the arm structure will advance until it abuts the end of the master cylinder connected to that section, and thereafter the pivotal arm structure will swing, the arms acting as levers of the second class, to advance the other working master cylinder plunger in its cylinder.

Valve mechanism and reaction means of FIGS. 7–9

The valve means 250 (FIG. 7) illustrated in the present embodiment of the invention is of the balanced, self-lapping type and is constructed and operates similar to the valve means of the form of the invention illustrated in FIGS. 1–7. The valve means includes a grommet 252 made in separate parts 282, 284 screwed together as proposed in my prior patents, Nos. 2,646,665 and 2,667,861, such that the parts may be adjusted in assembly relative to each other to adjust the amount of clearance of the vacuum valve. Thus the valve means controls the differential pressure on the opposite sides of the power wall 212 and is arranged at the center of the wall. The valve means grommet 252 is carried by a tubular air conduit member 254 which is effective to convey air received from an air filter 256 carried by the forward end of the output member assembly mounting sleeve 222. As will be seen in FIG. 7, air from the air filter is conveyed through openings or ports 258, 258a in the output member assembly elements, and ports 260 in the forward end of the air conduit member to the hollow center thereof. Radial passages 262 in the wall of the air conduit member convey air to the valve means grommet 252.

A feature of the present construction not disclosed in my prior patents above referred to involves slightly overbalancing the valve itself and substantially balancing the actuating means. For this purpose, the valve means 250 is actuated by an actuating rod 264 which extends along the longitudinal center axis of the power unit and is fixed at its inner end to a reaction plunger 266 which, in turn, is fixed to the air conduit member 254. The latter is telescoped within the output member assembly 220. For balancing purposes, a boot 268 fixed to a tube 269 on the casing and to the conduit member 254 defines a mean diameter M of the effective area of the actuating rod assembly exposed to air from the right side of the casing and substantially equal to the effective area of the air and vacuum valves. The reduced section of the air conduit member 254 has an effective area N slightly smaller than the area M providing a slight overbalance tending to seat the air valve as shown in FIG. 7 due to the vacuum in the casing. Foreign matter and air are excluded from the actuating rod side of the unit from entry into the air conduit member by the boot extension 268.

The valve means 250 in the present case provides an air valve for controlling admission of air from the air conduit member to the region within the casing behind the power wall. The valve means also provides a vacuum valve which controls communication between the opposite sides of the wall via a passage through the wall around the outside of the grommet 252. The casing 200 on the forward side of the power wall 212 is connected to a source of vacuum (FIG. 9) such as the vehicle engine intake manifold 270 through means such as a fitting 272 having a check valve (FIG. 10). The valve means 250 is shown in the off position in FIG. 7 with the vacuum valve open, the air valve closed, and both sides of the power wall 212 in direct communication and thus evacuated such that the power wall is vacuum suspended. With the valve means in the off position as shown in FIG. 7, a return spring 274 acts to urge the power wall to its retracted position assisted by a piston effect due to the arrangement of the output member assembly whereby the annular area O–M is exposed to vacuum from inside the casing, such that air from outside the casing tends to urge the output member assembly and power wall in the return direction.

As above stated, the valve means is of the self-lapping type, that is, upon successive movements of the actuating rod 264, air is admitted behind the power wall 212 to advance the latter, tending to move the valve elements to a lapped position (corresponding to the position of the valve elements in FIG. 5A) wherein both the air valve and vacuum valve are closed and the power wall is held stationary in this hold position. The air valve is provided between a valve seat 276 carried by the air conduit member and the grommet 252. The air valve seat is formed by a flange 278 which has a rear surface facing and cooperating with a deformable annular washer 280 carried by the grommet to form the cooperating element of an air valve. In this case, the grommet 252 is formed in two parts 282, 284, one threaded within the other, and holding a flexible air seal element 286 which wipes along the surface of the air conduit member 254.

A light spring 288 seated against a ridge on the air conduit member 254 and at the other end against the grommet 252 tends to urge the grommet air valve washer 280 against the air valve seat 276 such that the grommet 252 is carried with the air conduit member 254 upon movement thereof by the actuating rod. Upon such movement forwardly in the casing 200 from the off position as shown in FIG. 7, the grommet 252 is carried forward to seat the forward surface of a deformable ring 290 on the grommet and serving as one element of the vacuum valve against its cooperating vacuum valve seat 292 on the adjacent inner power wall 212. This has the effect of closing the passage between the opposite sides of the wall and blocking communication therebetween. Further movement of the actuating rod 264 will advance the air conduit member 254 relative to the grommet 252 so as to advance the air valve seat 276 ahead of the grommet washer 280 and thereby unseat and open the air valve. This has the effect of admitting air to the casing behind the power wall 212, whereupon the air pressure increases behind the power wall. The power wall will advance to move the valve means grommet 252 in its self-lapping action to close the air valve by moving the grommet washer 280 ahead onto its seat, both the air and the vacuum valves then being closed (in similar manner to that shown in FIG. 5A) in the lapped position of the valve means. It will be clear that successive increments of movement of the actuating rod will open the air valve to cause successive increments of movement of the power wall as the air pressure behind the power wall increases, producing the gradual increase in differential pressure which advances the power wall.

Turning now to the construction of the reaction means of the present embodiment of the invention, as shown in FIG. 7, said reaction means transmits reaction force from the master cylinders and divides such total reaction force between the power wall 212 and the actuating rod 264 which is connected to the means for actuation of the power booster unit such as a foot pedal. The reaction means includes the light valve return spring 262a and also includes a reaction spring 296 mounted between a washer 298 fixed at the forward end of the outer element 224 of the output member assembly 220, and a reaction ring 300 slidably received on the inner member 226 of the assembly. A body of deformable resilient compressible material such as synthetic rubber forming a reaction plug 302 is carried within the reaction ring 300 and divides the total reaction force transmitted to the reaction ring through the reaction spring 296 between the reaction plunger 266, connected to the actuating rod 264 for the power booster unit, and the power wall. For this purpose, as will be seen from FIG. 7, the forward end of the inner element 226 of the output member assembly 220 abuts the resilient plug or bumper 302 around the outer edge of the latter. The reaction plunger 266 which is connected and transmits reaction force to the actuating rod 264 is slidably received in the air conduit member 254 and is guided in its longitudinal travel by a rigid guide ring 306 slidably mounted in the forward end of the output member assembly. This rigid guide ring 306 seats against a shoulder 308 in the end of the inner member 226 of the output member assembly during initial stages of operation of the power booster unit such that the portion of the total reaction force transmitted to the reaction plunger 266 and thus to the actuating rod 264 and foot pedal, is determined by the area of the face of the reaction plunger 266. During later stages of operation, after a reaction change over point, the reaction plunger 266 enters the reaction plug 302 and deforms it, and in this process a shoulder 309 on the reaction plunger engages the guide 306 so as to carry the latter forward into the reaction plug. The reaction change over point may be adjusted so that it occurs earlier or later along the reaction curve by means of an adjustable stop member 312 which is screw threaded within the washer 298. A slot across the face of the stop member provides means for turning the member to adjust it axially for earlier or later engagement by the front face 313 of the reaction ring 300. During these later stages, reaction force is transmitted to the reaction plunger 266 over its area plus the area of the guide ring 306, such that a larger effective area is presented to the reaction plug 302 during such later operation stages. Due to the larger effective area of the reaction plunger, a greater proportion of the total reaction force is transmitted to the actuating rod 264 during later stages of unit operation, with the power wall advanced in the casing. It will, furthermore, be noted that the change in proportioning reaction force is gradual, due to the combination and cooperation in the reaction means of the reaction spring 296, the deformable reaction plug 302, and the change in effective area of the reaction plunger 266 caused by the guide ring 306.

*Additional features*

A further feature of the invention is the provision of means for adjustment of the off position of the power wall which is accessible from outside the unit and which, therefore, permits such adjustment with the engine running and the unit operating under manifold vacuum. To this end, there is provided an adjustment screw 325 which is accessible through a hole 327 in the air filter cover. The head 329 of the screw is slidably received in a longitudinal bore 330 in a portion projecting forward from the reaction ring 300 and is held against escape by a sleeve 332 which is crimped to the end of the reaction ring and has its end turned to slidably receive the shank of the adjustment screw while acting as a stop for the head of the screw. The opposite end of the screw 325 is threaded and received in a fixed end wall of a forward section 33 secured to the guide sleeve 222, this section 333 being ported for passage of air filtered through a filter element 256. The adjustment screw has, in this case, a hexagonal socket 336 to receive an Allen wrench so that the screw may be turned to draw the entire mechanism toward the forward end of the unit or to allow the mechanism to retract under the urging of the return spring 274. In this manner, adjustment may be made of the off position of the power wall 216 to maintain the clearance J of FIG. 4 between the master cylinder pistons and the cooperating elements of the equalizer arm structure, to permit full retraction of the master cylinder pistons and release of brake line pressure.

An advantage of the present invention is that all operating parts of the power units (and the manual unit of FIG. 1A) are assembled before being placed with the casing. Thus all valve clearances and reaction change over clearances may be set before assembly in the casing. After assembly, the off position of the mechanism can be set again if these master cylinder pistons fail to release.

I claim as my invention:

1. In a power booster for brakes, a housing including means for mounting, a pair of master cylinders fixed in parallel relation to forwardly project from said housing and having parallel pistons extending rearwarding inside said housing, said master cylinders being connected to fluid pressure transmitting lines to actuate said brakes, a movable pedal for actuating said pistons, a movable power wall in said housing providing power assist for said pedal, axially movable actuating means including relatively movable annular telescoping push and pull members extending longitudinally in said housing along an axis between said master cylinders, means connecting said push member for movement within said pull member upon movement of said power wall, additional means including a rod connecting said pull member for movement responsive to movement of said pedal and having a travel commensurate therewith, mechanism in said housing including a lateral projection for transmitting force from movement of said pull member to operate said pistons thereby producing fluid pressure in said lines, and reaction means between said push and pull members and said additional means for transmitting a portion of the reaction force presented by said pistons by way of said projection from said pull member for application to said pedal, by way of said additional means and said rod.

2. In a power booster for brakes, a housing including means for mounting, a pair of master cylinders fixed in parallel relation to forwardly project from said housing and having parallel pistons extending rearwardly inside said housing, said master cylinders being connected to fluid pressure transmitting lines to actuate said brakes, a movable pedal for actuating said pistons, a movable power wall in said housing providing power assist for said pedal, axially movable actuating means including relatively movable annular telescoping push and pull members extending longitudinally in said housing along an axis between said master cylinders, means connecting said push member for movement within said pull member upon movement of said power wall, additional means including a rod connecting said pull member for movement responsive to movement of said push member and said pedal and having a travel commensurate therewith, mechanism in said housing including a lateral projection for transmitting force from movement of said pull member to operate said pistons thereby producing fluid pressure in said lines, said mechanism also including a lever operatively associated with said lateral projection and said pull member intermediate its ends and engaging said pistons respectively adjacent its ends for moving said pistons axially in said master cylinders upon axial movement of said actuating means, and reaction means between said push and pull members and said additional means for transmitting a portion of the reaction force presented by said pistons by way of said projection from said pull member for application to said pedal, by way of said additional means and said rod.

3. In a power booster for brakes, a housing including means for mounting, output means, a movable pedal, a movable power wall in said housing providing power assist for said pedal, axially movable actuating means including relatively movable push and pull members extending longitudinally in said housing, means connecting said push member for movement upon movement of said power wall, means including a resilient bumper and a piston engageable with said bumper connecting said pull member for movement upon movement of said pedal, mechanism in said housing for transmitting force from movement of said pull member to operate said output means, and reaction means between said push and pull members for transmitting a portion of the reaction force presented by said output means from said pull member to said push member for application to said power wall, the remaining reaction force being applied through said resilient bumper to said pedal, said piston having different effective areas engageable with said bumper for changing the proportion of reaction force applied to the pedal at least during initial increments of movement thereof.

4. In a power booster for brakes, a housing including means for mounting, output means, a movable pedal, a movable power wall in said housing providing power assist for said pedal, axially movable actuating means including relatively movable push and pull members extending longitudinally in said housing, means connecting said push member for movement upon movement of said power wall, means including a resilient bumper and a piston engageable with said bumper connecting said pull member for movement upon movement of said pedal, mechanism in said housing for transmitting force from movement of said pull member to operate said output means, and reaction means between said members for transmitting a portion of the reaction force presented by said output means from said pull member to said push member for application to said power wall, the remaining reaction force being applied to said pedal through said resilient bumper.

5. In a power booster for brakes, a housing including means for mounting, output means, a movable pedal, a movable power wall in said housing providing power assist for said pedal, axially movable actuating means including relatively movable push and pull members extending longitudinally in said housing, means connecting said push member for movement upon movement of said wall, means including a resilient bumper and a piston engageable with said bumper connecting said pull member for movement upon movement of said pedal, mechanism in said housing for transmitting force from movement of said pull member to operate said output means, and reaction means between said members including nested spring washers for transmitting a portion of the reaction force presented by said output means from said pull member to said push member for application to said power wall, the remaining portion of said reaction force being applied to said pedal through said resilient bumper.

6. In combination with a power unit casing adapted to be connected to a source of vacuum, and having a forward end with an opening therein, a movable power wall suspended in vacuum in said casing and operable upon a pressure differential being produced across said power wall for movement forwardly in said casing, a master cylinder having a reservoir and a cylindrical body slidably receiving a plunger, means for mounting said master cylinder on said forward end of said casing with said master cylinder reservoir outside said casing and said cylindrical body extending into said casing through said opening, said master cylinder including a flange adjacent said reservoir thereof surrounding said cylindrical body and abutting said casing around said opening, and a valve in said cylindrical body between said master cylinder reservoir and bore and axially aligned with said plunger, said valve being closed upon forward movement of said plunger and being opened upon retraction thereof for fluid return to said reservoir, said casing providing a vacuum reservoir section adjacent said forward end and surrounding said master cylinder body, and mechanism connecting said master cylinder plunger for forward movement in said cylindrical body upon forward movement of said power wall in said casing toward said vacuum reservoir section.

7. For use in a power booster for brakes, having a housing with a forward section, and a master cylinder mounted on said forward section of said housing, said master cylinder having an end reservoir, a cylindrical body having a bore slidably receiving a plunger, and a valve in said cylindrical body between sad master cylinder reservoir and bore and axially aligned with said plunger, said valve being closed upon forward movement of said plunger and being opened upon retraction thereof for fluid return to said reservoir, the combination comprising, a movable power wall in said housing, output force transmitting means extending forwardly from said power wall into said forward section of said housing, said housing having means mounted on said forward section slidably receiving said output force transmitting means for guiding said power wall along an axis parallel to said master cylinder plunger, and means connecting said plunger for axial movement upon movement of said power wall.

8. For use in a power booster for brakes, having a housing with a forward section, and output means mounted on said forward section of said housing, the combination comprising, a movable power wall in said housing, output force transmitting means extending forwardly from said power wall into said forward section of said housing, said force transmitting means including relatively movable push and pull members with said push member extending forwardly from said power wall, said housing having means mounted on said forward section slidably receiving said push member for guiding said power wall longitudinally in said housing, reaction means including a resilient bumper and a piston engageable with said bumper connecting said pull member to said push member, and mechanism in said housing for transmitting force from movement of said pull member to operate said output means.

9. In a power booster for brakes, having a housing including a movable power wall, and output means adapted to be connected to said brakes for actuation thereof, the combination comprising, an output member operated upon movement of said wall, a manually actuated output member, and reaction means including a resilient bumper between said output means and both said output members for transmitting reaction force thereto, said reaction means further including a plunger connected to said manually actuated member and having primary and secondary reaction areas for engaging said bumper upon successive stages of operation of said power wall, said secondary reaction area being larger than said primary reaction area so as to transmit a proportionately greater reaction force to said manually actuated member in a succeeding stage of operation of said power wall.

10. In a power booster for brakes, a housing including means for mounting, output means, input means for connection to a movable pedal, and a movable power wall having a connection to a power source, an axially movable actuating means including at least three relatively movable thrust elements extending longitudinally in said housing for operating and controlling said booster, means connecting a first one of said elements for movements responsive to movement of said power wall, means connecting a second one of said elements for movement responsive to movement of said pedal, and means connecting a third one of said elements to said output means, said actuating means also including mechanism for transmitting a predetermined proportional reaction force between said three elements from said output means and also including an annular member arranged to encompass said three elements, and a guide element within said housing for supporting said annular member.

11. In a power booster for brakes, a casing including a forward wall and a rearward wall, a pair of master cylinders mounted in the forward wall of said casing and having parallel pistons extending rearwardly inside said casing, said master cylinders being adapted for connection to fluid pressure transmitting lines, a movable pedal for actuating said pistons, a movable power wall mounted within said casing between said rearward wall and the rear ends of said parallel pistons for providing power assist for said pedal, axially movable actuating means extending longitudinally in said casing along an axis between said master cylinders and operably connected for movement responsive to movement of said pedal and said power wall, mechanism in said casing of transmitting force from movement of said actuating means to operate said pistons thereby producing fluid pressure in said lines, reaction means operably connected between said pedal and said actuating means for transmitting a portion of the reaction force presented by said pistons back to said pedal.

12. In a power booster for brakes, a casing including a forward wall and a rearward wall, a pair of master cylinders mounted in the forward wall of said casing and having parallel pistons extending rearwardly inside said casing, said master cylinders being adapted for connection to fluid pressure transmitting lines, a movable pedal for actuating said pistons, a movable power wall mounted within said casing between said rearward wall and the rear ends of said parallel pistons for providing power assist for said pedal, axially movable actuating means extending longitudinally in said casing along an axis between said master cylinders and operably connected for movement responsive to movement of said pedal and said power wall, said actuating means including a push member for movement responsive to movement of said power wall, and a pull member for movement responsive to movement of said push member and said pedal, mechanism operably connected between said pull member and said pistons for transmitting force from movement of said pull member to operate said pistons thereby producing fluid pressure in said lines, reaction means operably connected between said pedal and said pull member for transmitting a portion of the reaction force presented by said pistons back to said pedal.

13. In a power booster for brakes, a casing including a forward wall and a rearward wall, a pair of master cylinders mounted in the forward wall of said casing and having parallel pistons extending rearwardly inside said casing, said master cylinders being adapted for connection to fluid pressure transmitting lines, a movable pedal for actuating said pistons, a movable power wall mounted within said casing between said rearward wall and the rear ends of said parallel pistons for providing power assist for said pedal, axially movable actuating means extending longitudinally in said casing along an axis between said master cylinders and operably connected for movement responsive to movement of said pedal and said power wall, mechanism including a lever pivotally connected intermediate its ends to said actuating means with the ends of said lever engaging said pistons respectively, without being connected thereto, for moving said pistons axially in said master cylinders upon axial movement of said actuating means, reaction means operably connected between said pedal and said actuating means for transmitting a portion of the reaction force presented by said pistons back to said pedal.

14. In a power booster for brakes, a casing including a forward wall and a rearward wall, a pair of master cylinders mounted in the forward wall in said casing and having parallel pistons extending rearwardly inside said casing, said master cylinders being adapted for connection to fluid pressure transmitting lines, a movable pedal for actuating said pistons, a movable power wall mounted within said casing between said rearward wall and the rear ends of said parallel pistons for providing power assist for said pedal, axially movable actuating means extending longitudinally in said casing along an axis between said master cylinders and operably connected for movement responsive to movement of said pedal and said power wall, mechanism in said casing for transmitting force from movement of said actuating means to operate said pistons thereby producing fluid pressure in said lines, reaction means operably connected between said pedal and said actuating means for transmitting a portion of the reaction force presented by said pistons back to said pedal, said reaction means including means for gradually increasing the proportion of reaction force applied to the pedal at least during initial increments of movement thereof.

15. In a power booster for brakes, a housing including means for mounting, output means, a movable pedal, a movable power wall in said housing providing power assist for said pedal, axially movable actuating means extending longitudinally in said housing and operably connected for movement responsive to movement of said pedal and said power wall, mechanism in said housing for transmitting force from movement of said actuating means to operate said output means, and reaction means including a resilient bumper and a piston operatively connected between said pedal and said actuating means for transmitting a portion of the reaction force presented by said output means to said pedal, said piston having different effective areas engageable with said bumper for changing the proportion of reaction force applied to the pedal at least during initial increments of movement thereof, said reaction means transmitting the remaining reaction force to said power wall.

16. In a power booster for brakes, a casing including a forward wall and a rearward wall and adapted to be connected to a source of vacuum, a pair of master cylinders mounted in the forward wall of said casing and having reservoirs outside said casing and parallel cylindrical portions having slidable pistons extending rearwardly inside said casing, said master cylinders being adapted for connection to fluid pressure transmitting lines, a movable pedal for actuating said pistons, a movable power wall mounted within said casing between said rearward wall and the rear ends of said parallel pistons for providing a power assist for said pedal, said power wall being suspended in vacuum in said casing when the latter is evacuated from said source, axially movable actuating means extending longitudinally in said casing along an axis between said master cylinders and operably connected for movement responsive to movement of said pedal and said power wall, mechanism in said casing for transmitting force from movement of said actuating means to operate said pistons thereby producing fluid pressure in said lines, said mechanism including a lever pivotally connected intermediate its ends to said actuating means and engageable with said pistons respectively adjacent its ends, without being connected to said pistons, for moving said pistons axially in said master cylinders upon axial movement of said actuating means, a return spring retracting said mechanism toward an off position, means for adjusting said mechanism to provide clearance between the pistons and said lever in the off position of said mechanism, and reaction means operably connected between said pedal and said actuating means for transmitting a portion of the reaction force presented by said pistons back to said pedal.

17. In a power booster for brakes, a housing including means for mounting, a pair of master cylinders fixed in parallel relation to forwardly project from said housing and having parallel pistons extending rearwardly inside said housing, said master cylinders being connected to fluid pressure transmitting lines to actuate said brakes, a movable pedal for actuating said pistons, a movable power wall in said housing providing power assist for said pedal, axially movably actuating means including relatively movable push and pull members extending longitudinally in said housing along an axis between said master cylinders, means connecting said push member for movement upon movement of said power wall, means connecting said pull member for movement responsive to movement of said push member and said pedal, mechanism in said housing for transmitting force from movement of said pull member to operate said pistons thereby producing fluid pressure in said lines, and primary reaction means between said push and pull members for transmitting a portion of the reaction force presented by said pistons from said pull member to said push member for application to said pedal, said reaction means including means for gradually increasing the proportion of reaction force applied to the pedal at least during initial increments of movement thereof, second resilient reaction means controlling relative motion between said push and pull members so as to define a changeover point in conjunction with said primary resilient reaction means.

18. In a power booster for brakes, a housing including means for mounting, a pair of master cylinders fixed in parallel relation to forwardly project from said housing and having parallel pistons extending rearwardly inside said housing, said master cylinders being connected to fluid pressure transmitting lines to actuate said brakes, a movable pedal for actuating said pistons, a movable power wall in said housing providing power assist for said pedal, axially movable actuating means including relatively movable push and pull members extending longitudinally in said housing along an axis between said master cylinders, means connecting said push member for movement upon movement of said power wall, means connecting said pull member for movement responsive to movement of said push member and said pedal, mechanism in said housing for transmitting force from movement of said pull member to operate said pistons thereby producing fluid pressure in said lines, and primary reaction means between said push and pull members for transmitting a portion of the reaction force presented by said pistons from said pull member to said push member for application to said pedal, said reaction means including means for gradually increasing the proportion of reaction force applied to the pedal at least during initial increments of movement thereof, second resilient reaction means controlling relative motion between said push and pull members so as to define a changeover point in conjunction with said primary resilient reaction means, and means for selectively varying the extent of said relative motion so as to provide for adjustment of said changeover point.

19. In combination with a power unit casing adapted to be connected to a source of vacuum, and having a forward section, a movable power wall suspended in vacuum in said casing and operable upon a pressure differential being produced across said power wall for movement forwardly in said casing, a master cylinder having a reservoir and a cylindrical body slidably receiving a plunger, means for mounting said master cylinder on said forward section of said casing with said master cylinder reservoir outside said casing and with a major portion of said cylindrical body extending into said forward section of said casing, said forward section providing a vacuum reservoir surrounding said master cylinder body, and mechanism connecting said master cylinder plunger for forward movement in said cylindrical body upon forward movement of said power wall in said casing toward said vacuum reservoir section.

20. In a power booster for brakes, a housing including means for mounting, output means, a movable pedal, a movable power wall in said housing providing power assist for said pedal, said power wall defining chambers in the housing divided by said wall with one of said chambers being connected to a subatmospheric pressure and the other chamber having a connection adapted to convey thereto a variable pressure, said power wall having a passage therethrough for connecting the two chambers, axially movable actuating means extending longitudinally in said housing for movement responsive to movement of said pedal and said power wall, mechanism in said housing for transmitting force from movement of said actuating means to operate said output means, a reaction mechanism operatively connected between said actuating means and said pedal for transmitting a portion of the reaction forces presented by said output means from said actuating means to said pedal, said reaction mechanism including means for varying the proportion of reaction force applied to the pedal at least during initial increments of movement thereof, said reaction mechanism also including an elongated tubular member mounted for movement with said pedal and extending through said variable pressure chamber, said tubular member forming an air passage for supplying atmospheric air to said variable pressure chamber, and valve means mounted on the outer surface of said tubular member for controlling the passage of air through said tubular member to said variable pressure chamber in accordance with longitudinal movements of said tubular member and said power wall, said tubular member and said valve means having effective areas tending to overbalance the valve means toward the lapped position for stabilizing the operation of the valve.

21. In a power booster for brakes, a housing including means for mounting, output means, a movable pedal, a movable power wall mounted within said housing for providing power assist for said pedal, axially movable actuating means extending longitudinally in said housing for movement responsive to movement of said pedal and said power wall, said actuating means including a push member for movement responsive to movement of said power wall, and a pull member for movement responsive to movement of said push member and said pedal, mechanism operably connected between said pull member and said output means for transmitting force from movement of said pull member to actuate said output means, a reaction mechanism operably connected between said pedal and said pull member for transmitting a portion of the reaction forces presented by said output means from said pull member to said pedal, said reaction mechanism including a primary resilient reaction means for varying the proportion of reaction force applied to said pedal and second resilient reaction means controlling relative motion between said push and pull members so as to define a changeover point in conjunction with said primary resilient reaction means.

References Cited by the Examiner

UNITED STATES PATENTS

| 2,857,584 | 10/1958 | Gibson. | |
|---|---|---|---|
| 2,902,121 | 9/1959 | Young et al. | 60—54.5 X |
| 2,905,278 | 9/1959 | Kramer | 60—54.5 |
| 2,953,936 | 9/1960 | Wiley | 60—54.6 X |
| 2,957,454 | 10/1960 | Stelzer | 60—54.6 |
| 3,021,677 | 2/1962 | Miller | 60—54.6 |
| 3,045,652 | 7/1962 | Moyer | 60—54.6 |

FOREIGN PATENTS 482,796   4/1938   Great Britain.

JULIUS E. WEST, *Primary Examiner.*

EDGAR W. GEOGHEGAN, *Examiner.*